Sept. 9, 1924.  
H. G. REIST ET AL  
DYNAMO ELECTRIC MACHINE  
Filed Oct. 30, 1922  
1,508,251
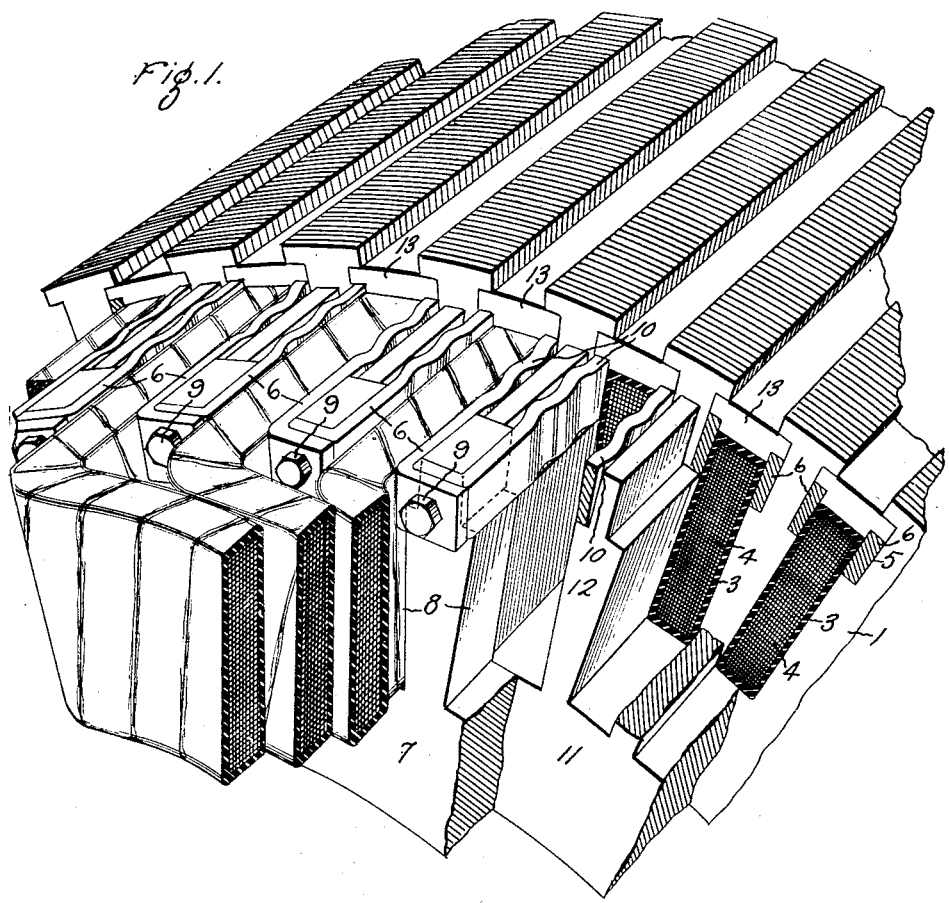
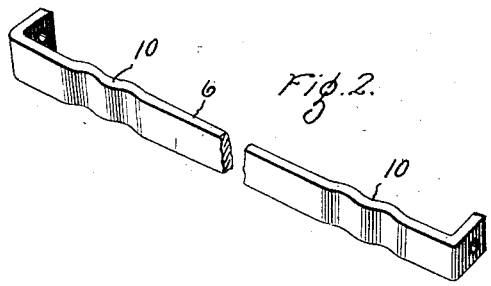
Inventors:  
Henry G. Reist,  
Earl S. Henningsen.  
by *Alexander D. Lunt*  
Their Attorney.

Patented Sept. 9, 1924.

1,508,251

UNITED STATES PATENT OFFICE.

HENRY G. REIST AND EARLE S. HENNINGSEN, OF SCHENECTADY, NEW YORK, ASSIGNORS TO GENERAL ELECTRIC COMPANY, A CORPORATION OF NEW YORK.

DYNAMO-ELECTRIC MACHINE.

Application filed October 30, 1922. Serial No. 597,719.

*To all whom it may concern:*

Be it known that we, HENRY G. REIST and EARLE S. HENNINGSEN, citizens of the United States, residing at Schenectady, in the county of Schenectady, State of New York, have invented certain new and useful Improvements in Dynamo-Electric Machines, of which the following is a specification.

Our invention relates to dynamo electric machines and particularly to a novel construction of a core member of such machines provided with two windings.

Heretofore in building a member of a dynamo electric machine provided with two windings, the construction was such that it was not possible to remove the winding, which it is often desirable to remove, without removing the other also. This was particularly true where one of the windings was composed of coils and the other was a short-circuited winding acting as an amortisseur or starting winding. In a machine provided with two such windings, occasion does not arise to remove the amortisseur or starting winding, but often the other winding must be removed. On the other hand, it is very desirable that the amortisseur or starting winding be placed near the surface of the member in which the windings are embedded. In accordance with our invention, two windings may be placed on a member of a dynamo electric machine and the one of them, which it is desired to remove, may be readily placed in position or removed without interfering or disturbing the other.

The various features of novelty which characterize our invention are pointed out in the claims annexed to and forming a part of this specification. For a better understanding of our invention reference may be had to the following description taken in connection with the accompanying drawing, in which Fig. 1 is a perspective view of a core member of a dynamo electric machine embodying our invention, and Fig. 2 is a perspective view of a detail.

Referring to the drawing, 1 is a core member of a dynamo electric machine having slots, in each of which there is disposed conductors 4 and 6 of a plurality of windings. Each of the slots has a reduced section 3 throughout a portion of its depth in which the conductor 4 of a winding is disposed. The slots also have portions 5 in which only the conductors 6 of a winding are disposed at the sides of the conductors 4. Each of the slots is preferably T-shaped with a conductor 4 in the central portion 3 of each slot and conductors 6 in the projecting portions 5 of each slot and at both sides of conductor 4. The conductors 6 are connected together to form a short-circuited winding through end rings 7. The end rings 7 consist of plates of suitable conducting material, such as copper, bronze, brass, or the like, and have slots 8 therein of substantially the same shape as the slots in the core member so that the teeth on the end ring correspond in shape to the shape of the teeth in the core member. The ends of adjacent conductors 6 on opposite sides of a tooth in the core member are bent and fastened to a tooth of the end ring as clearly shown in Fig. 1. These parts are shown as being fastened together by bolts 9 and in practice, silver solder is employed in addition to the bolts.

The conductors 6 are shaped as shown in Fig. 2, with corrugations 10 near the ends of the conductor to allow for expansion of the conductors during the starting operation when these conductors are apt to become quite hot due to the starting current.

The core member 1 is composed of laminations held together by end plates 11 having teeth 12, as shown, with slots therebetween of such width as to allow for the expansion of the conductors 6 during the starting operation.

The conductors 6 are first placed in the portions 5 of the slots which are of greater width than the portions 3. The width of the conductors 6 is such that they form substantially straight sides with the remaining portions 3 of the slots after they are in place. The conductors 4 of the other winding are then readily disposed in the remaining portions of the slots, without any interference from either the conductors 6 or the end rings 7. The conductors 4 are parts of a coil winding and thoroughly insulated from the core member 1, and are held in place by wedges 13. If it is desired to remove any coil formed of conductors 4, this may readily be accomplished without any interference from the conductors 6 and the end rings 7.

Our invention is particularly useful in the cylindrical rotor of a synchronous motor or generator, in which the conductors 4 form a distributed field winding designed to be excited by direct current and the conductors 6, the amortisseur and starting winding. The rotor in such a machine is provided in accordance with our invention with an amortisseur and starting winding without sacrificing any of the rotor winding space or without weakening the rotor construction.

We desire it to be understood that our invention is not limited to the particular arrangement shown and described, and we aim in the appended claims to cover all modifications which do not depart from the spirit and scope of our invention.

What we claim as new and desire to secure by Letters Patent of the United States, is:—

1. In a dynamo electric machine, a core member having slots therein, a plurality of windings having conductors in each of said slots, each of said slots having a reduced section throughout a portion of its depth, one of said windings comprising conductors disposed in the reduced section of said slots, and the other of said windings comprising conductors disposed only in the other portion of the slots and at the sides of the first mentioned conductors, said conductors in the reduced section of said slots being removable without interference with the conductors of said other windings.

2. In a dynamo electric machine, a core member having slots therein, a plurality of windings having conductors in each of said slots, each of said slots having a reduced section throughout a portion of its depth, one of said windings comprising conductors disposed in the reduced section of said slots, and the other of said windings comprising conductors disposed only in the other portion of the slots and at the sides of the first mentioned conductors, said conductors in the reduced section of said slots being removable without interference with the conductors of said other winding, the conductors of said second mentioned winding being connected together to form a short circuited winding.

3. In a dynamo electric machine, a core member having slots therein, a plurality of windings having conductors in each of said slots, said slots having a portion of greater width than the remaining portion, one of said windings having conductors only in the wider portions of said slots, said conductors being of such width that they form substantially straight sides with the remaining portions of said slots, the other of said windings being disposed in the remaining portions of said slots and being removable without interference with the conductors of the first mentioned winding.

4. In a dynamo electric machine, a core member having slots therein forming teeth between said slots, each of said slots having a reduced section throughout a portion of its depth, a winding comprising conductors disposed in the reduced section of said slots, a winding comprising conductors disposed in the other portions of said slots and at the sides of the first mentioned conductors, and an end ring having slots therein forming teeth therebetween corresponding in shape to the teeth in said core member, the conductors of said second mentioned winding being connected to said end ring to form a short circuited winding.

5. In a dynamo electric machine, a core member having slots therein forming teeth between said slots, each of said slots having a reduced section throughout a portion of its depth, a winding comprising conductors disposed in the reduced section of said slots, a winding comprising conductors disposed in the other portion of the slots and at the sides of the first mentioned conductors, and an end ring having slots therein forming teeth corresponding in shape to the teeth of said core member, the ends of adjacent conductors of said last mentioned winding on opposite sides of a tooth in said core member being bent and fastened to a tooth of said end ring to form a short circuited winding.

6. In a dynamo electric machine, a core member having substantially T-shaped slots therein, a plurality of windings having conductors in each of said slots, one of said windings comprising conductors disposed in the central portion of said slots, and the other of said windings comprising conductors disposed only in the projecting portions of said slots and at the sides of the first mentioned conductors, said conductors disposed in the central portion of said slots being removable without interference with the conductors of said other winding.

7. In a dynamo electric machine, a core member having substantially T-shaped slots therein, a plurality of windings having conductors in each of said slots, one of said windings comprising conductors disposed in the central portion of said slots and the other of said windings comprising conductors disposed only in the projecting portions of said slots and at the sides of the first mentioned conductors, said conductors disposed in the central portion of said slots being removable without interference with the conductors of said other winding, the conductors of said second mentioned winding being connected together to form a short circuited winding.

8. In a dynamo electric machine, a core member having substantially T-shaped slots therein forming teeth between said slots, a winding comprising conductors disposed in the central portion of said slots, a winding comprising conductors disposed in the projecting portion of said slots and at the sides of the first mentioned conductors, and an end ring having T-shaped slots therein forming teeth between said slots corresponding to the teeth in said core member, the conductors of said second mentioned winding being connected to said end ring to form a short circuited winding.

9. In a dynamo electric machine, a core member having substantially T-shaped slots therein forming teeth between said slots, a winding comprising conductors disposed in the central portion of said slots, a winding comprising conductors disposed in the projecting portion of said slots and at the sides of the first mentioned conductors, and an end ring having T-shaped slots therein forming teeth between said slots corresponding to the teeth in said core member, the conductors in said second mentioned winding fitting into the projecting portions of the slots in the end rings, the ends of adjacent conductors of said second mentioned winding on opposite sides of a tooth in said core being bent and fastened to a tooth of said end ring to form a short circuited winding.

In witness whereof, we have hereunto set our hands this 28th day of October, 1922.

HENRY G. REIST.
EARLE S. HENNINGSEN.